INVENTOR
S. M. SHACKELL, DECEASED
JANICE J. SHACKELL
HIS ADMINISTRATRIX
BY Kenneth B. Hamlin
ATTORNEY Feb. 23, 1971 S. M. SHACKELL 3,566,373

MAGNETIC CORE MEMORY CIRCUITS

Filed Jan. 10, 1958 3 Sheets-Sheet 2

INVENTOR
S. M. SHACKELL, DECEASED
JANICE J. SHACKELL
HIS ADMINISTRATRIX
BY Kenneth B. Hamlin
ATTORNEY Feb. 23, 1971 S. M. SHACKELL 3,566,373

MAGNETIC CORE MEMORY CIRCUITS

Filed Jan. 10, 1958 3 Sheets-Sheet 3

INVENTOR
S. M. SHACKELL, DECEASED
JANICE J. SHACKELL
HIS ADMINISTRATRIX
BY Kenneth B. Hamlin
ATTORNEY United States Patent Office 3,566,373
Patented Feb. 23, 1971

3,566,373

MAGNETIC CORE MEMORY CIRCUITS

Stanton M. Shackell, deceased, late of Mountainside, N.J., by Janice J. Shackell, administratrix, Fanwood, N.J., assignor, by mesne assignments, to Bell Telephone Laboratories, Incorporated, New York, N.Y., a corporation of New York Filed Jan. 10, 1958, Ser. No. 708,127
Int. Cl. G11c *5/02, 11/06, 17/00*
U.S. Cl. 340—174 28 Claims This invention relates to information storage arrangements and more particularly to magnetic core memory matrices adaptable for use in such arrangements.

Figure 1:
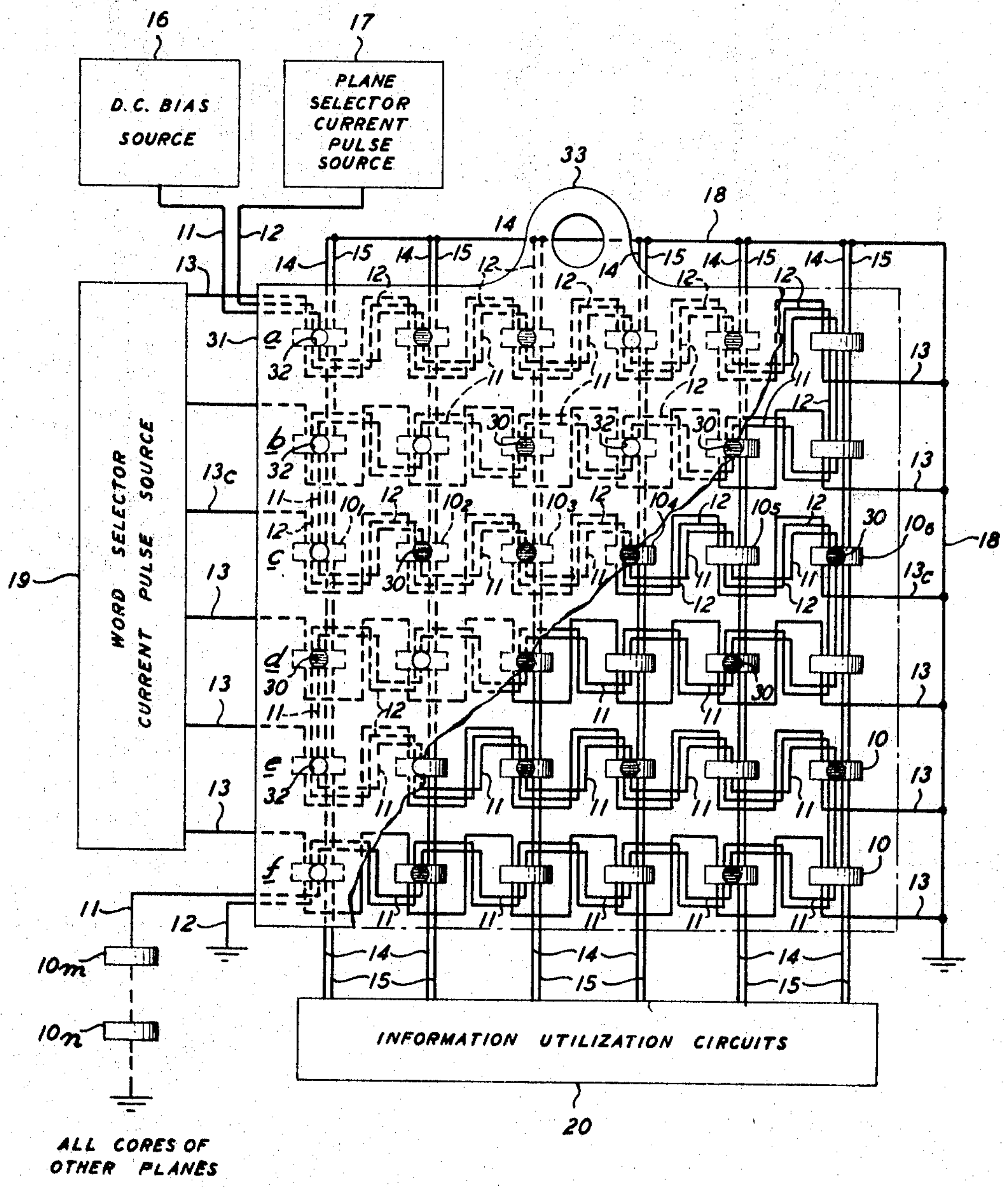

Memory matrices utilizing magnetic cores having substantially rectangular hysteresis characteristics are well-known in the information handling and switching arts. Such matrices have proven highly advantageous where large numbers of binary information bits must be temporarily or permanently stored and must also be readily accessible when needed. Where such factors as speed of access, reliability, or simplicity of associated circuitry, for example, are emphasized, the use of magnetic core memory matrices has become firmly established in the information handling art. A memory matrix of the character contemplated herein generally comprises a coordinate array of magnetic cores having inductively coupled thereto coordinate energizing conductors and read conductors which may thread the columns of cores if the matrix is word organized or a single read conductor may thread all of the cores of the array if the matrix is bit organized. The magnetic cores constituting the individual storage units of the matrix generally are, but need not be, toroidal in form. Thus an advantageous form of a magnetic core matrix may be a drilled plate in which the periphery of each aperture drilled constitutes the storage core. Such a matrix is described by R. L. Ashenhurst and R. C. Minnick in the copending application filed Dec. 31, 1953, Ser. No. 401,465 and now U.S. Pat. No. 2,912,677.

In most of such matrices employing magnetic cores functioning in accordance with conventional principles, the reading out of a binary information value stored in a core in the form of a representative condition of remanent magnetization is destructive. That is, in order to detect the character of an information value stored in a core it is necessary to switch the magnetic condition from the one representative of the information stored to a condition which may be representative of another value. Continued storage of the original information accordingly necessitates that it be rewritten in a core after each read-out or interrogation. In addition, any accidental switching of the core in which a particular information value is stored also results in the destruction of that information, but in such accidental destruction restoration of the information may not follow. This accidental destruction of stored information may present a serious problem in an information processing system where the stored information represents, for example, the program controlling the operation or operations of other and numerous associated components of the system. Although error detection means may be devised, positive permanent storage of information in magnetic cores is to be preferred from the viewpoint both of reliability and economy of associated circuitry.

Accordingly, it is an object of this invention to store information in a magnetic core matrix such that the information so stored is not destroyed by the read-out operation.

It is another object of this invention to store information in a magnetic core matrix such that the information so stored is not destroyed by the inadvertent switching of the magnetic state of a core.

A further object of this invention is to provide a new and novel magnetic core memory matrix.

Still another object of this invention is the permanent and non-destructive storage of programming information in a magnetic core memory matrix.

A still further object of this invention is the storage of binary information in a magnetic memory matrix in a new and novel manner.

The above objects are realized in one embodiment according to the principles of this invention comprising a conventional arrangement of magnetic toroidal cores in a coordinate array. The cores may be associated in any of the well-known means for accomplishing the magnetic switching of the conditions of remanent magnetization therein for the writing and reading operations. However, according to one feature of this invention, binary information values are stored in a particular core of the matrix by representative operative conditions of the core. That is, one binary value may be determined by the condition of normal response to an applied switching current and the other binary value may be determined by the condition of inability of the core to respond to an applied switching current. According to this feature particular cores of the matrix are disabled in accordance with the information which is to be stored, by placing, in one embodiment of this invention, permanent magnets in the proximity of the cores to be disabled such that the fields of the permanent magnets prevent the normal switching behavior of the cores upon the application of a switching current. Effectively therefore, information may be stored in a matrix according to the present invention by the presence or absence of a magnet or its disabling field in the proximity of the cores in which the information is to be stored.

According to another feature of this invention the permanent magnets performing the information representative disabling function may be mounted on a non-magnetic sheet, which sheet is movable into juxtaposition with the cores of the matrix. In this manner information may be mechanically and selectively introduced into the matrix by simply bringing selected sheets in which the information has been pre-written in the form of a particular pattern of permanent magnets into association with the matrix.

In accordance with still another feature of this invention interrogation may be accomplished in a conventional manner, that is, by applying switching currents to a core tending to reverse the condition of remanent magnetization previously induced therein. In the case of a non-disabled core, that is, one containing a particular binary value, the condition of magnetization will be reversed thereby inducing a read-out voltage in a read winding inductively coupled to the core. A read-out signal will accordingly be indicative of one of the binary values and no read-out signal will be indicative of the other binary value.

According to still another feature of this invention all of the cores of the matrix are driven to, and maintained in, one condition of remanent magnetization by a continuously applied biasing current. Selected ones of the cores are then disabled in accordance with the information to be non-destructively stored in the matrix as described in connection with the foregoing features. When a switching current is now applied to selected rows of the coordinate array, if word organized, or to selected individual cores, if bit organized, the non-disabled cores will switch to produce an output signal in the conventional manner while no signal is produced by the cores prevented from switching. An accidentally applied switching current applied to a core is thus non-destructive of stored information since in the case of a disabled core no such switching can occur and in the case of the other cores the continuously maintained bias immediately restores the core to its information-bearing state.

Although in accordance with a foregoing feature of this invention the disabling of particular cores of the matrix in accordance with information to be stored was accomplished by a particular pattern of disabling permanent magnets, it is another feature of this invention that the representational disabling of the cores may be accomplished by means of permanently placed permanent magnets. In one such arrangement the permanent magnets themselves may be disabled in a particular pattern in accordance with the information to be stored by interposing an apertured magnetic shield between the cores of the matrix and the permanently placed permanent magnets. Disabling of particular magnetic cores is then accomplished by the fields of the permanent magnets operating through the apertures of the shield, which apertures are spaced in a pattern in accordance with the information to be stored. In this manner information may also be mechanically and selectively introduced into the matrix by simply inserting desired shielding plates, in which the information has been prewritten in the form of a particular pattern of apertures, between the cores and the permanent magnets. Obviously, in accordance with this feature, one set of permanent magnets may be permanently fixed between two planes of cores, each plane forming a two-dimensional matrix.

The shielding of the disabling cores may also be accomplished in another manner by an interposed sheet. In this case a non-magnetic sheet is employed in which magnetic plugs or spots are introduced in a spaced pattern representative of the information to be stored in the matrix. Thus the magnetic plugs or spots effectively shield particular cores of the matrix from the disabling field of the adjacently placed permanent magnets. The non-magnetic sheet itself will, of course, have little effect on the fields of the other magnets and the cores appearing opposite the latter magnets will be disabled. Shielding sheets of this character may obviously also be selectively replaced in accordance with information which it is desired to store. Such selective replacement may advantageously be effected in a number of ways. Thus a number of single sheets may be stored in a selecting mechanism such that selected sheets are alignable adjacent particular core planes. Such a mechanism could then be conveniently operable to move the selected sheets opposite the core planes. Or the sheets may be continuous and flexible and conveniently stored in rolls. Selected areas of the continuous sheet containing the patterns of magnetic spots representing the stored information are then unreeled into position adjacent the core planes from a plurality of such rolled sheets by means of suitable mechanical reeling apparatus.

Figure 2:
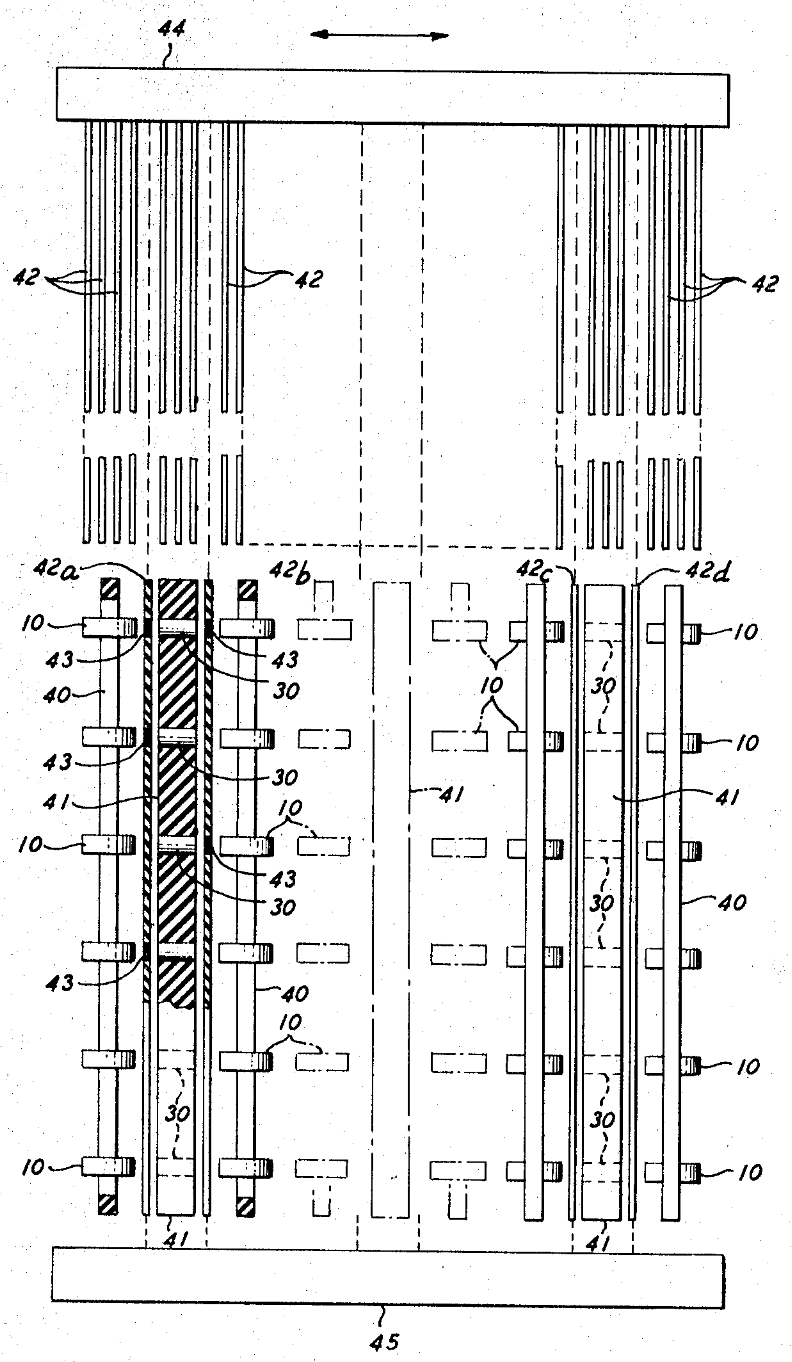
Figure 3:
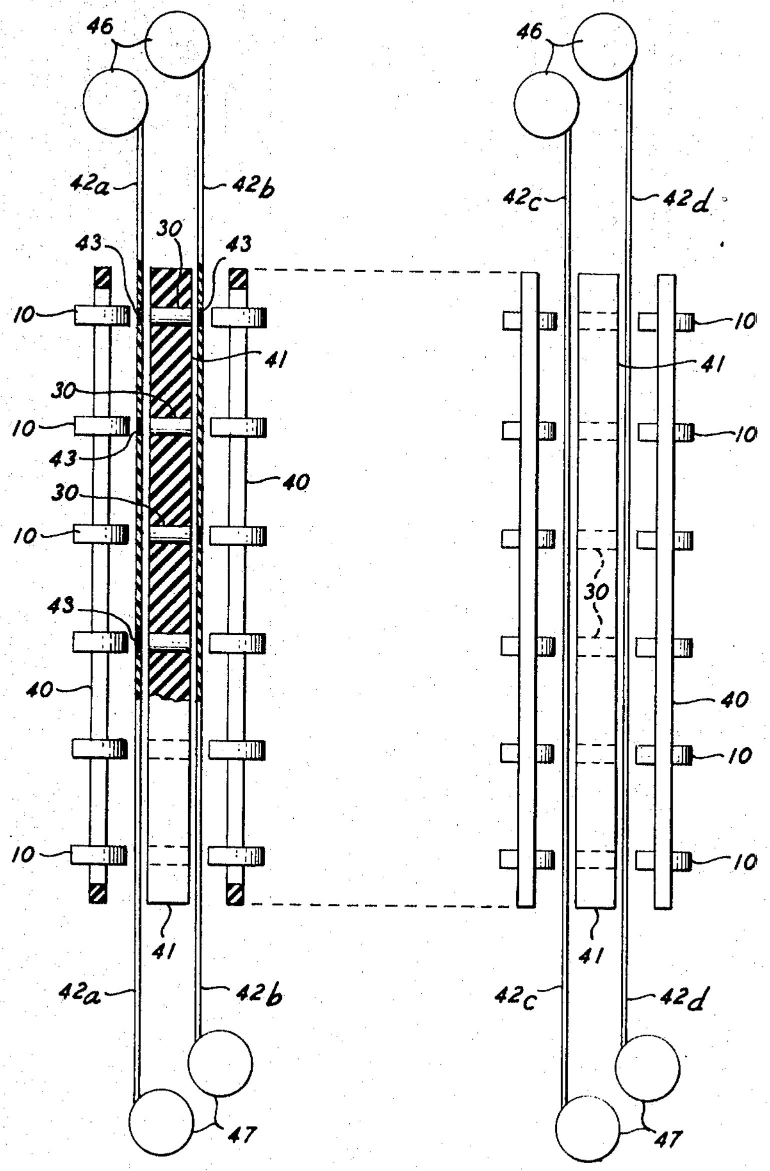

The foregoing and other objects and features of this invention will be better understood from a consideration of the detailed description of illustrative embodiments thereof which follow when taken in conjunction with the accompanying drawing in which:

FIG. 1 is a plan view of one plane of a three-dimensional magnetic core matrix having associated therewith a non-magnetic sheet having a pattern of permanent magnets therein illustrating one embodiment of this invention; the sheet is shown partially broken away to disclose the magnetic cores in side elevation;

FIG. 2 is a side view of a three-dimensional magnetic core matrix showing one arrangement for introducing permanently stored information into individual planes of the array in another illustrative embodiment of this invention; and FIG. 3 is a side view of a three-dimensional magnetic core matrix showing another arrangement for introducing permanently stored information into individual planes of the array of the illustrative embodiment of this invention also shown in FIG. 2.

The single plane shown in FIG. 1 of the drawing, of an illustrative magnetic core matrix embodying the principles of this invention, comprises a plurality of magnetic toroidal cores 10 each shown in side elevation. The core 10 are conventionally arranged in rows and columns and are functionally related by means of a plurality of conductors inductively coupled to the cores. For purposes of description a 6 x 6 array is assumed for each plane, the rows being designated *a* through *f*. Each core has threaded therethrough a matrix conductor 11, a plane conductor 12, a row conductor 13, and a pair of column conductors 14 and 15. The matrix conductor 11 is connected at one end to a direct current bias source 16 and at its other end to ground and is continuously threaded through the cores of all of the planes of the matrix. The cores of other planes, not shown, are represented by the cores $10_m$ and $10_n$ in FIG. 1. The biasing current provided by the source 16 is of a polarity and magnitude such as to maintain the cores of the matrix in one condition of remanent magnetization, and may be any suitable source such as is well-known in the art. The plane conductor 12 threads only the cores of a particular plane, as is shown in FIG. 1, and is connected at one end to a plane selector current pulse source 17 and at its other end to ground. Each of the row conductors 13 thread only the cores of particular rows and also terminate at one end in ground provided by a grounded bus 18. Connected to each of the conductors 13 of each plane is a word selector current pulse source 19 for selectively or sequentially providing current pulses to the row conductors 13. Such circuits accomplishing this function are also well-known in the art and are shown only in block symbol form. The sources 17 and 19 are controlled in a manner so as to simultaneously produce current pulses to their respective conductors of a polarity and magnitude such that the total magnetomotive force generated by the simultaneous and coincident current pulses is sufficient to switch the cores threaded by the above respective conductors from the one condition of remanent magnetization to the other condition against the oppositely tending force originating in the bias source 16.

Each of the pairs of column conductors 14 and 15 threads only the cores of particular columns and the conductors 14 and 15 are connected between the grounded bus 18 and suitable information utilization circuits 20. Circuits of the latter character contemplated herein utilizing output pulses representing particular binary information values are well-known in the art and are also shown in FIG. 1 in block symbol form. The column conductors 14 and 15 conveniently constitute the read or sensing conductors of the planes of the matrix and are conventionally energized responsive to the switch of magnetic flux in the cores to transmit output signals to the utilization circuits 20. Two read conductors 14 and 15 are provided for each column so that output signals of either polarity may most advantageously be handled. Although the conductors are shown for simplicity and clarity in FIG. 1 as threading the cores in the same direction, i.e. being coupled to the cores in the same sense, in practice this may not be the most practicable arrangement. Thus, it may be advantageous to thread the cores in alternate directions with the result that output pulses of both polarities are generated and in such a case the double column conductors 14 and 15 provide a more economical means for handling the two-poled output signals than additional circuitry responsive to either signal may be. That output signals of either polarity are representative of a single binary information value in this invention will be demonstrated hereinafter. Obviously, the matrix selected to illustrate the principles of this invention is word-organized, that is, the coincident application of current pulses from the sources 17 and 19 will interrogate any entire row of the matrix such that the output signals appearing parallelly on the column conductors 14 and 15 indicate the character of the word stored in that row.

It is to be understood, however, that this invention can be employed with equal facility with a bit organized matrix, the difference being only in the organization of the switching conductors threading the cores.

The generally conventional coordinate array of magnetic cores comprising one plane of the matrix thus far described has associated therewith, in one illustrative embodiment, a plurality of permanent magnets 30 conveniently mounted in a non-magnetic plate 31 by means of holes 32 drilled therein. The holes 32 and the magnets 30 mounted therein are arranged to correspond precisely with the coordinate arrangement of magnetic cores 10. The plate 31 may be mounted in juxtaposition to the plane of cores 10 such that each of the magnets 30, which may conveniently comprise bar magnets, has its longitudinal axis along a radius of its associated toroidal core. Although such a radial arrangement of the magnets with respect to the cores was found practicable, this invention may with equal advantage be performed with the bar magnets arranged with their longitudinal axes along the axes of the cores. The particular installation of the matrix with which the present invention is to be practiced may dictate the most advantageous manner in which a mechanical mounting means permitting the replacement of the plate 31 is realized. A lug 33 may be conveniently provided on the plate 31 to facilitate replacement if manual means are used. One requirement of the mounting means of whatever character employed, in addition to the necessity of maintaining the permanent magnets 30 in alignment with associated cores 10, is that the magnets 30 be maintained in proximity to the cores 10 such that their fields will effect a sufficient saturation of the cores to be disabled.

For purposes of clarity the plate 31 is shown broken away in FIG. 1 though it is to be understood that it extends over the entire matrix plane, as indicated by the broken line. Further, to facilitate an understanding of this invention, the magnets 30 which are positioned and supported by the broken away portion of the plate 31 are shown adjacent their respective magnetic cores even though the supporting plate 31 is itself not shown.

Initially, before any information has been introduced into a plane of the matrix, all of the cores 10 will be driven to one condition of remanent magnetization by the continuous application of the biasing current on the matrix conductor 11 from the source 16. This condition may be held representative of either binary value and here this condition will be designated "1." Thus, initially each core 10 of the plane has stored therein a binary "1." When a plate 31, having a particular pattern of permanent magnets 30 mounted therein as shown in FIG. 1, is moved into association with the core array particular cores of each row will be acted upon by the fields of the permanent magnets. Thus, assuming the pattern of permanent magnets 30 as shown in FIG. 1 wherein each permanent magnet is represented by a shaded circle, the row *c*, for example, will have the cores $\mathbf{10}_2$, $\mathbf{10}_3$, $\mathbf{10}_4$, and $\mathbf{10}_6$ magnetically saturated as controlled by the applied fields of the associated permanent magnets 30. The saturating field will thus effectively maintain these cores in a condition of magnetic saturation over-riding the force exerted by the continuously applied biasing current from the source 16. More important, however, this condition of magnetic saturation will also be maintained in spite of subsequently applied switching currents from the sources 17 and 19. This condition of magnetic saturation will be designated a binary "0." The typical row *c* thus has the binary word 100010 stored therein as depicted in FIG. 1. Obviously, the condition of saturation representing a binary "0" remains unaffected by any stray currents tending to switch the cores and such currents can affect a binary "1" only momentarily since the continuous biasing current restores each of the cores containing this value to its representative magnetic condition.

Upon the application of coincident switching currents from the sources 17 and 19 to the plane conductor 12 and row conductor $\mathbf{13}_c$, respectively, all of the cores of the typical row *c* not disabled by the saturation of the permanent magnets 30 will be momentarily switched to the opposite condition of remanent magnetization. Thus cores $\mathbf{10}_1$ and $\mathbf{10}_5$ will so switch and output voltages will be induced in the column conductors 14 and 15 threading these cores in the conventional manner. These output voltages, of either polarity as governed by the sense of the threading conductors as previously mentioned, will indicate the presence in the switching cores of a binary "1" and the fact of no appreciable signal will indicate the presence in the disabled or saturated cores of a binary "0." Thus, more specifically, the ability of a core 10 to respond normally to an applied switching current may be said to represent a binary "1" and its inability to so respond may be said to represent a binary "0." The output signals appearing simultaneously on the conductors 14 and 15 may be utilized, as stated hereinbefore, by circuits adapted to receive the information so read out of the matrix plane. Upon the removal of the applied switching currents the cores $\mathbf{10}_1$ and $\mathbf{10}_5$ will be automatically restored to the magnetic condition representing a "1" by the biasing current applied to the matrix conductor 11 from the source 16. Although the matrix plane shown in FIG. 1 is assumed to be the first of a plurality of such planes composing the matrix, interrogation of any row in any plane is readily accomplished by applying coincident switching currents from a plane selector current pulse source 17 supplying the particular plane in which the desired row appears and from a word selector current pulse source 19 supplying the row conductor 13 of the selected row.

Although the principles of this invention have been described in the foregoing in connection with a binary information storage arrangement, they may obviously be extended to realize such an arrangement in other numbering systems. Thus, it will be noted that three distinct stable magnetic conditions of the cores have been described in the foregoing, only two of which are utilized to represent values in the binary system. By a reorganization of the energizing conductors a memory matrix may be realized based on a ternary system of numbering, two of the values being represented by two-poled output signals and the other value being represented by the absence of an output signal. Such a modification and the utilization of three-value electrical output conditions are known and will readily present themselves to one skilled in the art.

FIG. 2 shows in side-elevation a matrix employing an alternate means for associating permanent magnet means into an operative relation with the cores of the planes. A 6 x 6 x 6 matrix is here assumed for purposes of illustration with each of the cores 10 also being shown in side-elevation. The cores 10 of each plane are shown for convenience only as being enclosed in a mounting frame 40 and no energizing conductors are shown for the sake of clarity in depicting the mechanical aspects of this invention. Since the organization and operation of the magnetic core planes may be identical to that described for the basic arrangement of FIG. 1, no further description of the energizing conductors need be made. Each of the toroidal cores 10 of each of the planes has associated therewith a permanent magnet 30, which may conveniently also be of the bar type, and each of the permanent magnets 30 is permanently mounted in a non-magnetic plate 41 which may be maintained in a fixed relationship with the associated core planes in any suitable manner. As is shown in FIG. 2, a single array of permanent magnets may advantageously be associated with two planes of the matrix, the field of each magnet having been found sufficient to saturate two cores. As was the case for the embodiment of FIG. 1, all of the cores of the matrix will initially tend to be driven to one condition of remanent magnetization by the biasing current applied to a matrix conductor assumed, but not shown, to be threading all of the cores of the matrix. In this embodiment, however, because of the effect of the fields of the permanently placed magnets, all of the cores of the matrix will initially be magnetically saturated and thus be in a condition representative of a binary "0" rather than a "1."

Information is introduced into the matrix embodiment of FIG. 2 by the interposition between each core plane and its associated permanent magnets of a sheet of non-magnetic material, such as one of the sheets 42. Each of the sheets 42 has inlaid or otherwise suitably mounted therein magnetic spots or slugs 43 which are located on the shet between particular cores of a plane and the associated permanent magnets. The particular arrangement or pattern of spots 43 in the sheets 42 obviously is representative of particular information to be stored in the rows of cores of the planes. Each spot 43, by providing a low reluctance path for the field of a permanent magnet 30, effectively shields the associated core 10 from the saturating effect of that field. The shielded core is thus free to assume the condition of remanent magnetization to which the biasing current, above referred to, tends to drive it, that is, the condition representative of a binary "1."

A number of methods of realizing the sheets 42 including the spots 43 may be advantageously employed. Thus a magnetic spot 43 may be directly deposited on a non-magnetic carrier sheet. Or, alternately, a non-magnetic metallic carrier sheet may be held beneath a magnetic sheet during the manufacturing process. A machine, program controlled, can then, by simultaneously punching through both sheets, introduce the punched out magnetic slugs into the non-magnetic lower sheet.

When the selected sheets 42 have been inserted between the permanent magnets 30 and the cores of all of the planes, the information, initially contained in the patterns of magnetic shielding spots 43 on the plates, is translated into patterns of normally operative cores and magnetically saturated cores just as was the case for the matrix plane described for FIG. 1. The reading out of the information so represented is identical to that also described for the embodiment of FIG. 1. Coincident switching currents are also here applied to plane and row conductors, not shown, to momentarily switch the magnetic condition of the shielded cores of a row of a plane to generate output voltages representative, in either polarity, of binary "1's" stored in the particular row being interrogated. Obviously, the fact of no appreciable output signal on a read-out column conductor is again representative of a binary "0."

The particular arrangement of this invention shown in FIG. 2 lends itself advantageously to the mechanical selection of the information sheets 42 and to their introduction into and removal from the matrix. Thus, mechanical indexing means 44 may be provided which also may conveniently store a supply of sheets 42 each containing predetermined information available for introduction into the matrix. The indexing means 44 may be manually controllable or may itself be operated responsive to information controlled external circuits, not shown. By relative movement of the means 44 in controlled increments with respect to the matrix planes, selected ones of the sheets 42 may be moved into alignment with the slots formed by the interstices between the cores and permanent magnets. The means 44 may then include suitable tripping mechanisms by means of which the selected sheets 42 are dropped or lowered into the slots open thereto. Thus in FIG. 2 the sheets $42_a$, $42_b$, $42_c$, and $42_d$ are shown as having been selected and interposed between the respective core planes and permanent magnets. The indexing means 44 only in general configuration constitutes a part of this invention and the specific mechanical details of such arrangements are well-known in the arts utilizing mechanical devices performing indexing and tripping functions. If the sheets 42 are merely dropped into the respective slots, removal may be readily accomplished in the same manner. Thus a second tripping mechanism 45 may be provided to selectively release and store information sheets 42 after use.

Still another arrangement for accomplishing the selective introduction and removal of the information sheets 42 is depicted in FIG. 3. The organization and operation of the matrix there shown is identical to that described in connection with the matrix of FIG. 2. The information sheets 42 here comprise flexible, continuous bands having the spots or slugs 43 also inserted therein but in pluralities of information patterns on each continuous sheet. Storage reels 46 may conveniently be provided on which the sheets 42 are wound, the reels 46 being controllable to move selected patterns in juxtaposition with an array of permanent magnets of the matrix. Each sheet 42 may be taken up on a take-up reel 47 also provided. Obviously, the storage and take-up reels 46 and 47 may be synchronously operated, either manually or by automatic mechanisms operated in turn by other information controlled arrangements of the system of which the matrix may be part.

The mechanical arrangements shown in FIGS. 2 and 3, which may advantageously be employed to carry out the principles of this invention, are to be understood as illustrative only. Thus, other means and methods will readily present themselves to one skilled in the mechanical art to effect the introduction and removal of information-bearing sheets into operative relation with the permanent magnet arrays. The other aspects of this invention described herein are also to be considered as illustrative and numerous other arrangements according to the principles of this invention may be devised with respect to these aspects also by one skilled in the art without departing from the spirit and scope of this invention.

What is claimed is:

1. An information storage matrix comprising an array of magnetic cores, each having a first and a second condition of remanent magnetization, a plurality of conductor means inductively coupled to said cores and relating said cores in predetermined coordinates, means for generating a plurality of magnetic fields, said fields being capable of being associated with selected cores of said array in any combinatorial relations in accordance with information stored in said combinatorial relations to prevent said selected cores from switching from either of said conditions of remanent magnetization to the other, means for applying setting currents to one of said conductor means to set other cores of said array to said first condition of remanent magnetization, means for applying switching currents to another of said conductor means for switching said other cores from said first to said second condition of remanent magnetization, and means responsive to said core switching for generating output signals indicative of said information stored in said array.

2. An information storage matrix comprising an array of magnetic cores, each having a first and a second condition of remanent magnetization, a plurality of conductor means inductively coupled to said cores and relating said cores in predetermined coordinates, means for applying setting currents to one of said conductor means for driving said cores to said first condition of remanent magnetization, means for applying switching currents to another of said conductor means for switching said cores to said second condition of remanent magnetization, a plurality of coding means each comprising a plurality of individual magnets arranged in a different predetermined pattern, said plurality of coding means being selectively movable into association with said array to prevent the switching of predetermined cores of said array in accordance with said predetermined patterns, and means responsive to the switching of said cores for generating signals indicative of said predetermined patterns.

3. An information storage matrix comprising an array of magnetic cores each having a first and a second remanent flux condition, means for driving said cores to said first remanent flux condition, means for switching said cores to said second remanent flux condition, input means for introducing information into said matrix comprising a plurality of groups of magnet means, the magnet means of each of said groups being arranged in different patterns in accordance with particular information, selecting means for selectively moving said groups of magnet means adjacent said array to prevent the switching of particular cores of said array in accordance with said particular information, and means responsive to the switching of said cores for generating output signals indicating said particular information.

4. An information storage matrix according to claim 3 in which said selecting means comprises a plurality of non-magnetic plates each having permanent magnets imbedded therein and arranged in different patterns in accordance with said particular information.

5. In an information storage matrix, the combination comprising a coordinate array of magnetic cores each having a first and a second remanent flux condition, means for driving said cores to said first remanent flux condition, means for switching said cores to said second remanent flux condition, and means for preventing the switching of particular ones of said cores in accordance with information stored in said matrix comprising magnet means associated adjacent each of said cores for magnetically saturating said cores and shielding means interposed between the cores of said array and said magnet means comprising a magnetic plate having apertures therein adjacent said particular cores.

6. An information storage matrix comprising a plurality of magnetic cores arranged in rows and columns, each of said cores being capable of assuming a first and a second condition of remanent flux, a first and a second conductor threading all of said cores, a plurality of third conductors threading respectively the cores of said rows of cores, means for applying a current to said first conductor to drive said cores to said first condition of remanent flux, means for applying coincident currents to said second conductor and to a selected one of said plurality of third conductors to switch the cores of a particular row to said second condition of remanent flux, means for preventing the switching of particular cores in each of said rows of cores in accordance with information stored in said rows comprising a plurality of permanent magnets arranged respectively adjacent said plurality of magnetic cores, a plurality of non-magnetic plates each having magnetic inserts therein arranged in patterns in accordance with different information to be stored in said matrix, and means for selectively interposing said plates between said plurality of magnetic cores and said plurality of permanet magnets, and a plurality of fourth conductors threading respectively the cores of said columns of cores, said fourth conductors having signals induced thereon responsive to said switching of said cores in each of said rows of cores indicative of one binary information value.

7. An information storage matrix according to claim 6 in which said plurality of plates are each defined on a continuous sheet and also comprising reeling means for said sheet for selectively interposing said plates containing said patterns of magnetic inserts between said plurality of magnetic cores and said plurality of permanent magnets.

8. An information storage matrix having a plurality of planes, each of said planes comprising rows and columns of magnetic cores, each of said cores being capable of assuming a first and a second remanent flux condition, a matrix conductor threading all of the cores of said matrix, a plurality of plane conductors threading the cores of each of said planes, respectively, a plurality of row conductors threading the cores of each of said rows of cores, respectively, of each of said planes of cores, means for applying a current to said matrix conductor to drive all of the cores of said matrix to said first remanent flux condition, means for coincidentally applying switching currents to the plane and row conductors of a selected plane and row for switching the cores of said selected row to said second remanent flux condition, permanent magnet means arranged adjacent each core of said matrix for preventing said switching of said cores, magnetic shielding means for each plane of said matrix for magnetically shielding particular cores of each of said planes of cores from said permanent magnets in accordance with information stored in said matrix, and a plurality of column conductors threading the cores of each of said columns of cores, respectively, of each of said planes of cores, said column conductors having signals induced thereon responsive to said switching of the cores of said selected row indicative of the information stored in said selected row.

9. An information storage matrix according to claim 8 in which said magnetic shielding means comprises a plurality of non-magnetic plates, each of said plates having a pattern of magnetic inserts therein, said pattern being representative of the information to be stored in a plane of said matrix, and also comprising means for selectively interposing said plates between the cores of a plane and said permanent magnet means.

10. An information storage matrix according to claim 8 in which said magnetic shielding means comprises a plurality of continuous non-magnetic sheets, each of said sheets having patterns of magnetic inserts therein, said patterns being representative of information to be stored in a plane of said matrix, and also comprising reeling means for each of said sheets for interposing selected patterns of magnetic inserts between the cores of said planes and said permanent magnet means.

11. An information storage matrix comprising a coordinate array of magnetic cores each having a substantially rectangular hysteresis characteristic, means for inducing a remanent flux condition of one polarity in said cores, means for changing said remanent flux condition of said cores to another polarity, means for selectively preventing flux changes in said cores in accordance with information stored in said matrix comprising a plurality of magnet means for permanently applying an external magnetic field to corresponding ones of said cores to magnetically saturate each of said cores and means for shielding the fields of said magnet means adjacent nonselected cores of said coordinate array of magnetic cores in accordance with said information stored in said matrix; and means responsive to said changing of said remanent flux condition to generate output signals indicative of said information stored in said matrix.

12. In an information storage matrix, the combination comprising a coordinate array of magnetic cores each having a first and second remanent flux condition, means for driving said cores to said first remanent flux condition, means for switching said cores to said second remanent flux condition, and means for preventing the switching of particular ones of said cores in accordance with information stored in said matrix comprising magnet means associated adjacent each of said cores for magnetically saturating said cores and shielding means interposed between the cores of said array and said magnet means comprising a non-magnetic plate having magnet inserts therein adjacent the cores of said array except said particular cores.

13. A memory device comprising an array of information addresses on a particular medium, a plurality of magnetic means for generating effective magnetic fields at particular ones of said information addresses, said magnetic fields being arranged in a coded pattern in accordance with stored information, and means for reading out said stored information comprising an array of magnetic cores corresponding to said array of information addresses, means including a pulse source for applying switching currents to said cores to switch said cores to one direction of magnetic saturation, particular ones of said cores being arranged within said effective magnetic fields and being maintained in the other direction of magnetic saturation by said magnetic fields and prevented from switching to said one direction thereby, and output windings coupled to each of the remaining cores of said array energized responsive to the switching of said last-mentioned cores for generating output signals indicative of said stored information.

14. A memory device according to claim 13 in which said particular medium comprises a non-magnetic plate and said plurality of magnetic means comprises a plurality of permanent magnets set in said plate at said particular ones of said information addresses.

15. A memory device according to claim 13 in which said particular medium comprises a non-magnetic plate and said plurality of magnetic means comprises an array of magnets corresponding to said array of information addresses and magnetic inserts in said non-magnetic plate at information addresses other than said particular ones of said information addresses to shunt the magnetic fields at said last-mentioned information addresses.

16. A memory device according to claim 13 in which said plurality of magnetic means comprises an array of magnets corresponding to said array of information addresses and said particular medium comprises a magnetic plate having apertures therein corresponding to said particular ones of said information addresses.

17. An electrical circuit comprising a plurality of magnetic means for generating a plurality of magnetic fields arranged in an ordered array, a plurality of magnetic switching elements arranged in an array corresponding to said ordered array, each of said elements being disposed such as to be held in one direction of magnetic saturation by a corresponding effective one of said magnetic fields, an information storage means comprising means interposed between said plurality of magnetic means and said plurality of switching elements for shunting said magnetic fields from a particular pattern of magnetic switching elements in accordance with stored information, means including switching windings on said elements for applying a switching magnetomotive force to said elements to switch said last-mentioned elements to the other direction of magnetic saturation, and output windings on said last-mentioned elements energized responsive to said switching for generating output signals indicative of said stored information.

18. An electrical circuit according to claim 17 also comprising a biasing means for biasing each of said magnetic switching elements in said one direction of magnetic saturation with a magnetomotive force less than said switching magnetomotive force.

19. An information storage matrix comprising an array of magnetic switching means, each of said switching means being capable of assuming a first and a second stable magnetic state, a plurality of conductor means inductively coupled to said switching means and relating said switching means in predetermined coordinates, information storage means for generating a plurality of magnetic fields, said information storage means being adapted to associate said magnetic fields with selected switching means of said array in any combinatorial relations in accordance with information stored in said information storage means to prevent said selected switching means from switching from either of said stable magnetic states to the other, means for applying setting currents to one of said conductor means to set others of said switching means of said array to said first stable magnetic state, means for applying switching currents to another of said conductor means for switching said others of said switching means from said first to said second stable magnetic state, and means responsive to the switching of said others of said switching means for generating output signals indicative of said information stored in said information storage means.

20. A magnetic storage device comprising a plurality of magnetic elements arranged in rows and columns to form a matrix, said magnetic elements each being constituted of ferromagnetic material and possessing two stable opposite remanence states, a reading conductor coupled to each magnetic element, and means for permanently recording information in said device by disabling selected elements of the matrix, said disabling means including a plurality of permanent magnets each capable of premagnetizing one of said magnetic elements when in close proximity thereto and thus effectively removing the said premagnetized element from the matrix, and means for bringing said permanent magnets each into the close proximity of one of said selected elements.

21. A magnetic storage device according to claim 20, wherein said means for bringing said permanent magnets each into close proximity of one of said selected elements comprises a plate-like member having said permanent magnets mounted and arranged thereon to correspond substantially to said selected elements, said plate-like member being disposed with respect to said matrix to effectuate said close proximity between said permanent magnets and the respective selected elements of said matrix.

22. A magnetic storage device comprising a plurality of magnetic elements arranged in rows and columns to form a matrix in a plane, said magnetic elements each being constituted of ferromagnetic material and possessing two stable opposite remanence states, a conductor coupled to each of said magnetic elements, and means for permanently recording information in said device by disabling selected elements of the matrix, said disabling means including a plate-like member and a plurality of permanent magnets mounted on said plate-like member and arranged substantially similarly to the magnetic elements and each capable of premagnetizing one of said magnetic elements when in close proximity thereto and thus effectively removing the said premagnetized element from the matrix, said plate-like member being positionable adjacent the matrix with a permanent magnet in close proximity to each selected element, said plate-like member lacking magnets at positions corresponding to the non-selected elements.

23. A magnetic storage device comprising a plurality of magnetic core elements arranged in rows and columns to form a matrix in a plane, said magnetic elements each being constituted of ferromagnetic material having a rectangular hysteresis loop and possessing two stable opposite remanence states, a pair of conductors threaded through each of said magnetic elements, and means for permanently recording information in said device by disabling selected elements of the matrix, said disabling means including a plurality of permanent magnets mounted in a plane parallel to the matrix plane and arranged substantially similarly to the magnetic elements and each capable of premagnetizing one of said magnetic elements when in close proximity thereto and thus effectively removing the said premagnetized element from the matrix, and means for moving selected ones of the permanent magnets in a predetermined direction each into the close proximity of one of said selected elements.

24. A magnetic storage device comprising a plurality of magnetic core elements arranged in rows and columns to form a plane matrix, said magnetic elements each being constituted of ferromagnetic material having a rectangular hysteresis loop and possessing two stable opposite remanence states, reading and writing conductors coupled to each magnetic element, and means for permanently recording information in said device by disabling selected elements of the matrix, said disabling means including a plurality of permanent magnets arranged in a plane substantially parallel to the matrix plane in rows and columns in registration with that of the magnetic elements, said permanent magnets being movable along a given path from a first position remote from the magnetic elements to a second position in close proximity thereto whereby it is capable of premagnetizing the proximate magnetic element and thus effectively remove the said premagnetized element from the matrix, and a plate-like member containing recesses in an array related to the selected magnetic elements for bringing selected ones of said permanent magnets each into the close proximity of one of said selected elements.

25. In combination with a switching matrix of a type comprising, a plurality of magnetic core members arranged in columns and rows each said members made of magnetic material exhibiting opposite stable states of flux remanence and having input output winding means coupled thereto, an input terminal for each said row connected to the input winding means of each said element thereof for switching each element of each row from one stable state to another, and an output terminal for each of said columns connected to the output winding means of each element thereof for manifesting an output signal in response to the switching of any element of said column, and means comprising, a plurality of permanent bar magnets, and a support structure for said bar magnets having apertures therein, said structure located in close proximity to said core members and supporting said bar magnets for positioning one end of given ones of said bar magnets in close proximity to a corresponding one of said members to apply a transverse field to the core members and inhibit the switching thereof from one magnet state to another.

26. In combination with a switching matrix of a type comprising, a plurality of magnetic core members arranged in columns and rows each said members made of magnetic material exhibiting opposite stable states of flux remanence and having input, output and bias winding means coupled thereto, said bias winding means of each member capable of establishing each said element in a first stable magnetic state, an input terminal for each said row connected to the input winding means of each said member thereof for switching the states of each member of each row, and an output terminal for each of said columns connected to the output winding means of each member thereof for manifesting an output signal in response to the switching of any member of said column, and means comprising, a plurality of permanent bar magnets, a support structure for said bar magnets having apertures therein, said structures located in close proximity to said core members and supporting said bar magnets for positioning one end of given ones of said bar magnets in close proximity to a corresponding one of said members to apply a transverse field to the members and inhibit the switching thereof from one magnetic state to another.

27. In combination, a plurality of magnetic elements each having a magnetic field associated therewith, a plurality of bistable elements, each of which is switchable, in the absence of an inhibiting magnetic field, between first and second stable states for producing output signals, means coupling selected ones of said magnetic fields to inhibit switching of selected ones of said bistable elements in accordance with a predetermined information-representative pattern, and means actuating said bistable elements between said stable states for reading out information represented in said pattern.

28. In combination, an array of permanently magnetized devices arranged in a predetermined information-representative pattern, each of said devices having an external magnetic field associated therewith, an array of bistable elements which are more numerous than said devices and which are arranged in a further pattern wherein a different one of said elements is within the field of each of said devices to be inhibited thereby, each of said elements being switchable, in the absence of an inhibiting magnetic field, between first and second stable states for producing output signals, and means actuating said elements between said stable states for reading out information represented in said pattern of devices.

References Cited

UNITED STATES PATENTS

| | | | |
|---|---|---|---|
| 2,740,110 | 3/1956 | Trimble | 340—174 |
| 2,769,873 | 11/1956 | Novegaard | 340—174 |
| 2,814,031 | 11/1957 | Davis | 340—174 |
| 2,820,216 | 1/1958 | Grottrup | 340—174 |
| 2,843,838 | 7/1958 | Abbott | 307—88 |
| 2,781,503 | 2/1957 | Saunders | 340—174 |

JAMES W. MOFFITT, Primary Examiner